US 8,019,200 B2

(12) United States Patent
Ong et al.

(10) Patent No.: US 8,019,200 B2
(45) Date of Patent: Sep. 13, 2011

(54) METHOD AND SYSTEM FOR MEDIA FILE CONVERSION

(75) Inventors: Chin Leong Ong, Singapore (SG); Seh Eing Lim, Singapore (SG)

(73) Assignee: Creative Technology Ltd, Singapore (SG)

( * ) Notice: Subject to any disclaimer, the term of this patent is extended or adjusted under 35 U.S.C. 154(b) by 1346 days.

(21) Appl. No.: 11/594,044

(22) Filed: Nov. 6, 2006

(65) Prior Publication Data

US 2008/0107170 A1 May 8, 2008

(51) Int. Cl.
*H04N 5/93* (2006.01)
(52) U.S. Cl. .................................. 386/279; 386/284
(58) Field of Classification Search .................. 386/200, 386/248, 252, 253
See application file for complete search history.

(56) References Cited

U.S. PATENT DOCUMENTS

| | | | |
|---|---|---|---|
| 6,999,512 B2 | 2/2006 | Yoo | |
| 7,039,116 B1 | 5/2006 | Zhang | |
| 2005/0197108 A1 | 9/2005 | Salvatore | |
| 2005/0207739 A1* | 9/2005 | Kamio | 386/125 |
| 2006/0036610 A1 | 2/2006 | Wang | |
| 2007/0226238 A1 | 9/2007 | Kiilerich et al. | |

OTHER PUBLICATIONS

Amazon.com web site featuring Apple iPod with Video Playback (Black) for sale, Date first available for sale on Amazon: Oct. 2, 2001, 3 pages.
Amazon.com web site featuring Creative Zen Vision:M 30 GB MP3 and Video Player (Black) for sale, Date first available for sale on Amazon: Dec. 12, 2005, 3 pages.
Cnet.com web site reviewing Apple iTunes 6, Reviewed: Oct. 27, 2005, 5 pages.
Cnet.com web site reviewing Windows Media Player 10, Reviewed: Sep. 1, 2004 (updated Jun. 14, 2005), 5 pages.

* cited by examiner

*Primary Examiner* — Huy T Nguyen (57) ABSTRACT

There is provided a method for automatically converting a media file for playback on a portable media player. The method includes specifying the type of the portable media player. If a stream of the media file is not capable of being played back by the portable media player, the stream is discarded. If a stream of the media file is capable of being played back and is supported by the portable media player, the stream is then directly copied to the player. Where a stream of the media file is capable of being played back and is not supported by the portable media player, the stream is then converted using a predetermined codec that is supported by the portable media player, the predetermined codec selected on a basis of playback quality, output file size and file conversion time. A corresponding system and software is also disclosed.

9 Claims, 6 Drawing Sheets

METHOD AND SYSTEM FOR MEDIA FILE CONVERSION

TECHNICAL FIELD

The invention concerns a method and system for automatically converting a media file for playback on a portable media player, particularly in aspects relating to conversion duration, file size and playback quality.

BACKGROUND OF THE INVENTION

Media content is provided in many different formats. Many formats are not natively supported by various portable media players. Accordingly, such content is required to undergo a time-consuming conversion process to a supported format.

Typically, media content consists of media data and miscellaneous data. Media data includes audio and video streams. These streams are encoded using different codecs and packaged into different file containers. For instance, an AVI video (the file container format) may comprise a DivX encoded video stream and an MP3 encoded audio stream. The same streams can also be packaged into a MOV file container and appear as a different video to the portable media player.

Similarly, an audio stream may be encoded using different codecs and may be packaged into different file containers.

Therefore, to determine if media content is supported by and playable on a portable media player, the following components have to be considered:
1. File container—The portable media player must recognize the file container format before it knows how and where to parse the audio and video (for video content only) streams within the file.
2. Audio stream—The audio stream must be encoded using a codec supported by the portable media player in order for the portable media player to decode the audio stream. In addition, the portable media player may limit certain properties of the audio stream that it is capable of supporting. For instance, the sampling rate, the bit per sample, the number of audio channel and the bitrate of the encoded audio stream may be limited to suit the audio capability of the portable media player.
3. Video stream (for video content only)—The video stream must be encoded using a codec supported by the portable media player in order for the portable media player to decode the stream. In addition, the portable media player may limit certain properties of the video stream that it is capable of supporting. For instance, the dimension (width and height), the frame rate, the color depth and the bitrate of the encoded video stream may be limited to suit the video capability of the portable media player.

Previous attempts at simplifying and expediting the conversion process have had various degrees of success.

For example, iTunes 6 only allows video formats supported by the iPod to be downloaded to the iPod. Users are required to manually convert any unsupported formats before download. Only files listed in the iTunes video library can be selected for conversion. The files eligible for conversion are limited to those files that are supported by iTunes. Other video formats can be converted using an export function of Quick-Time Pro or other third party software.

In another example, Windows Media Player 10 (WMP10) only permits video files from its Media Library to be downloaded to a portable media player. Therefore, file formats that are unsupported by WMP10 are excluded. While downloading to the portable media player, WMP10 automatically converts all WMV/ASF videos regardless of whether the formats are already supported by the Media Transfer Protocol (MTP) player. For other file types (for example, AVI), WMP10 copies them to the MTP player without conversion. There is no assurance that transferred files are playable in the MTP player.

Therefore, there is a desire to simplify and expedite the conversion process which ensures that the converted video or audio content is playable on a portable media player.

SUMMARY OF THE INVENTION

There is provided a method for automatically converting a media file for playback on a portable media player. The method includes specifying the type of the portable media player. If a stream of the media file is not capable of being played back by the portable media player, the stream is discarded. If a stream of the media file is capable of being played back and is supported by the portable media player, the stream is then directly copied to the player. Where a stream of the media file is capable of being played back and is not supported by the portable media player, the stream is then converted using a predetermined codec that is supported by the portable media player, the predetermined codec selected on a basis of playback quality, output file size and file conversion time.

Preferably, where a file container of the media file is not supported by the portable media player, the streams of the media file are repackaged to a supported file container of the portable media player. The media file may comprise at least one item such as, for example, a video stream, an audio stream and miscellaneous data. The converted media file may preferably be copied to the portable media player. The type of the portable media player may be selected by the user, or detected automatically when the portable media player is connected to a computer performing the conversion.

There is also provided a system for automatically converting a media file for playback on a portable media player. The system comprises a detection module to determine the type of the portable media player; and a conversion module to determine whether a stream of the media file requires transcoding. A stream of the media file which is not capable of being played back by the portable media player may be discarded. Alternatively, a stream of the media file capable of being played back and supported by the portable media player may be directly copied to the portable media player. Where a stream of the media file is capable of being played back and is not supported by the portable media player, the stream is then converted using a predetermined codec that is supported by the portable media player, the predetermined codec selected on a basis of playback quality, output file size and file conversion time.

The system may also comprise a file transfer module for transferring the converted media file to the portable media player either automatically or on a delayed time basis according to a predetermined time schedule. The system may preferable include a codec library to store a plurality of codecs, each codec being assigned a priority level on a basis of playback quality, output file size and file conversion time, and associated with a list of supported portable media players.

In another aspect of the present invention, there is provided a software program for automatically converting a media file for playback on a portable media player. The software program may comprise a detection module to determine the type of the portable media player; and a conversion module to determine whether a stream of the media file requires transcoding.

BRIEF DESCRIPTION OF THE DRAWINGS

An example of the invention will now be described with reference to the accompanying drawings, in which.

DETAILED DESCRIPTION OF THE PREFERRED EMBODIMENTS

The drawings and the following discussion are intended to provide a brief, general description of a suitable computing environment in which the present invention may be implemented. Although not required, the invention will be described in the general context of computer-executable instructions, such as program modules, being executed by a computer such as a personal computer, laptop computer, notebook computer, tablet computer, PDA and the like. Generally, program modules include routines, programs, characters, components, data structures, that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, mini-computers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
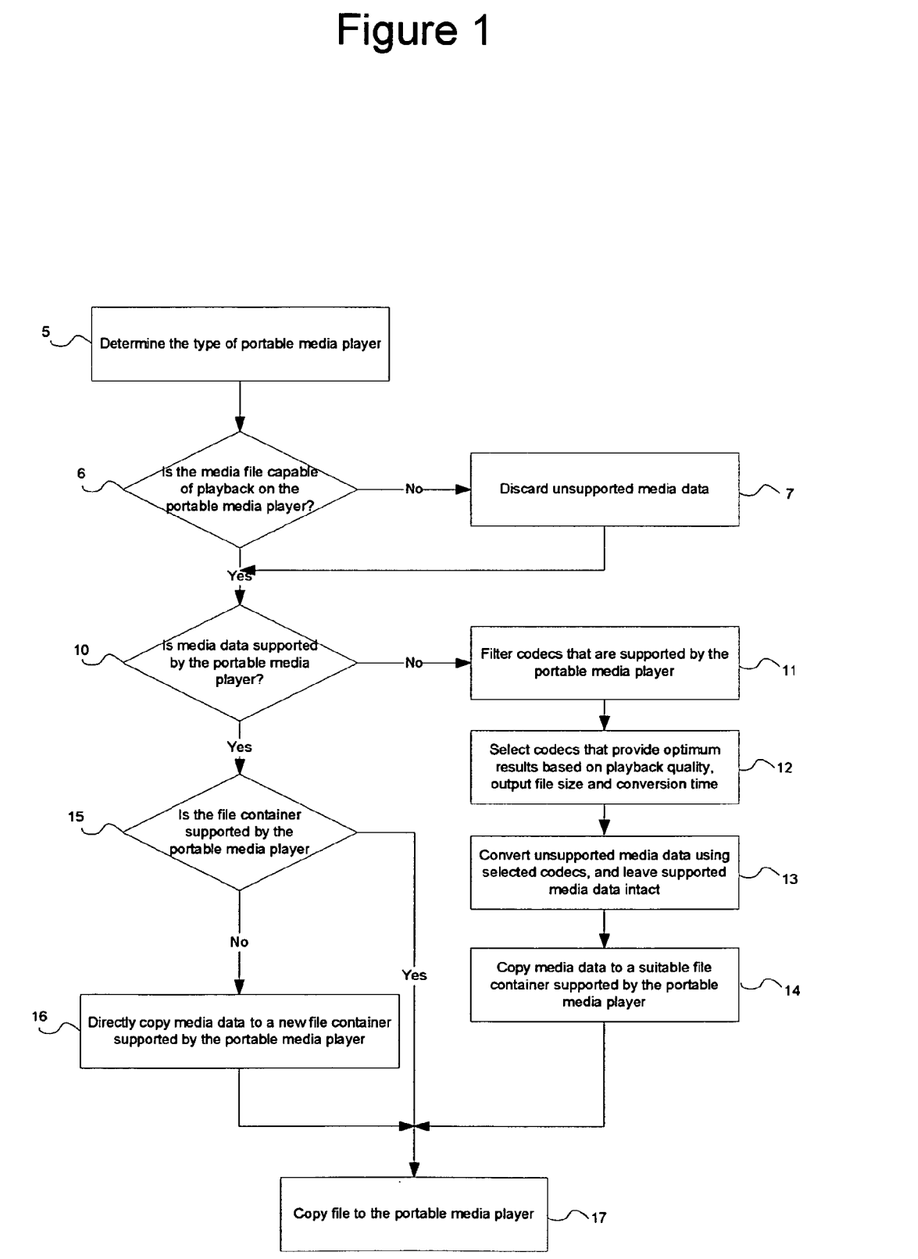
FIG. 1 is a process flow diagram of a conversion method in accordance with a preferred embodiment of the present invention.
Figure 2:
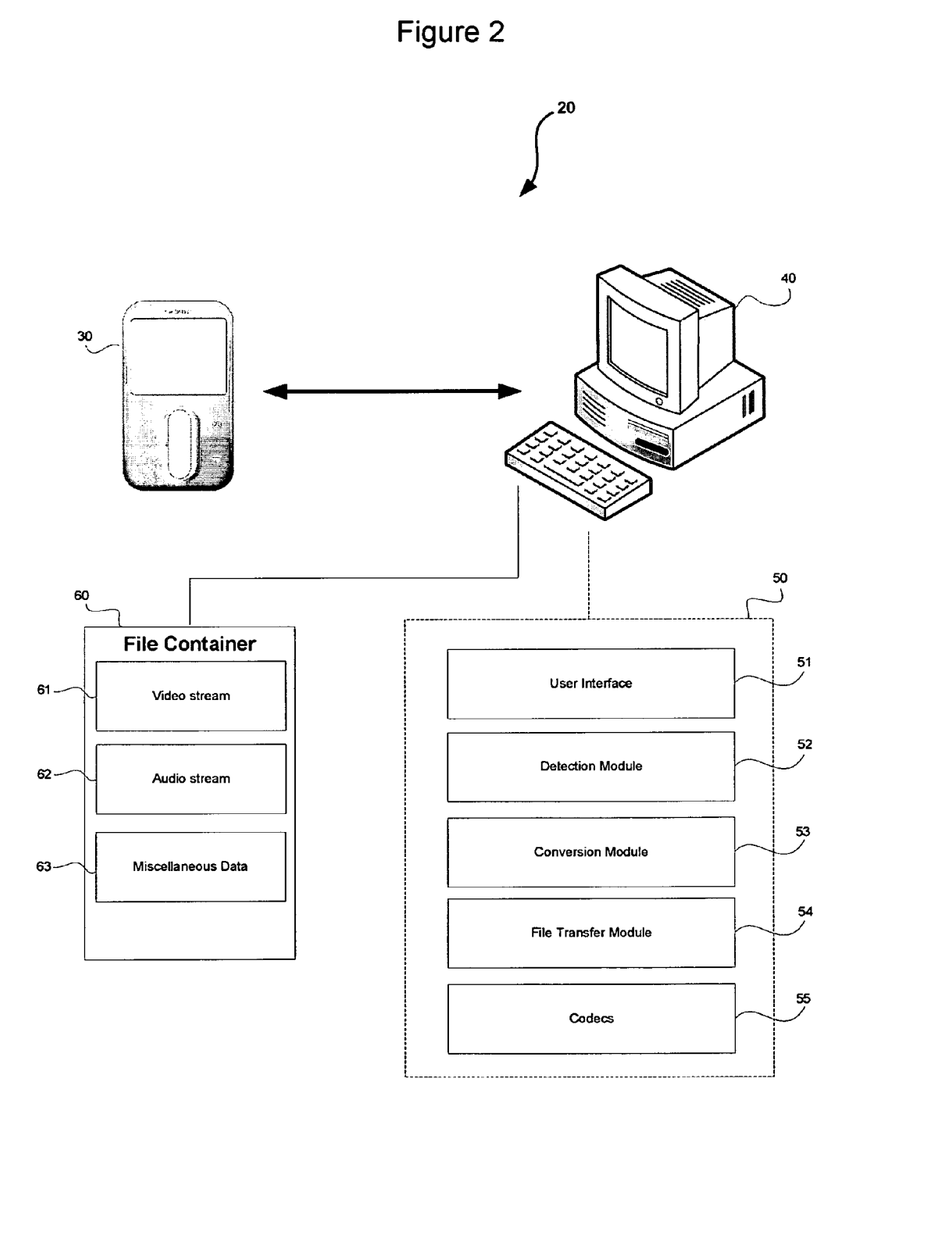
FIG. 2 is a block diagram of a system in accordance with a preferred embodiment of the present invention.

Referring to FIGS. 1 and 2, a system 20 for automatically converting a media file 60 for playback on a portable media player 30 is provided. The system 20 generally comprises: a client 50 installed on a computer 40 to which the portable media player 30 is operatively connected to by cable or wirelessly. The computer 40 also stores media files 60 which may be selected for conversion and transfer to the portable media player 30 for subsequent playback.

The client 50 comprises a user interface 51, detection module 52, conversion module 53, file transfer module 54 and codecs 55. Some screenshots of the user interface 51 is depicted in FIGS. 5 to 8.

Figure 4:
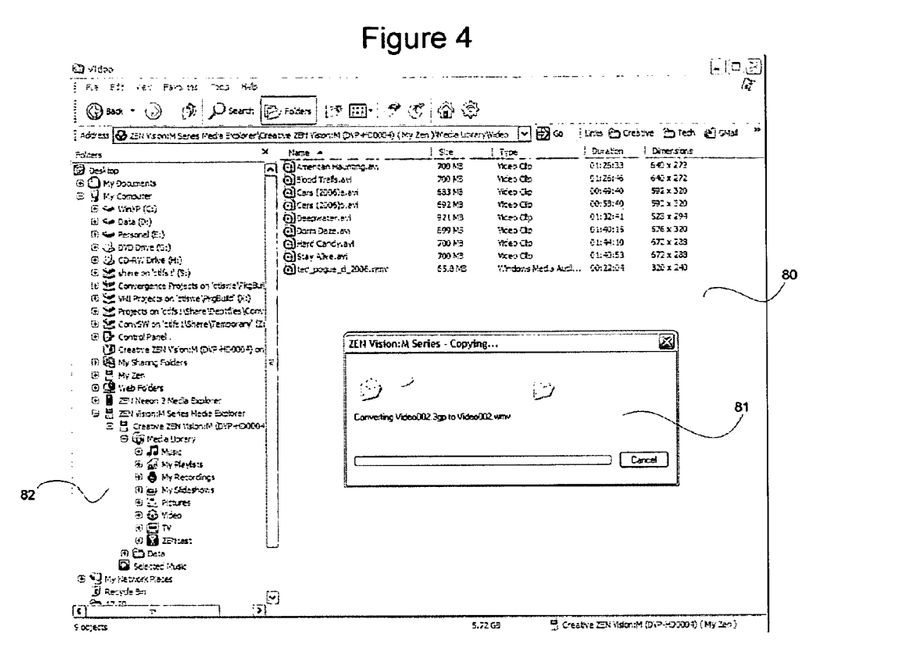
FIG. 4 is a screenshot of a file conversion being performed using drag and drop in Windows Explorer™ in accordance with a preferred embodiment of the present invention.
Figure 5:
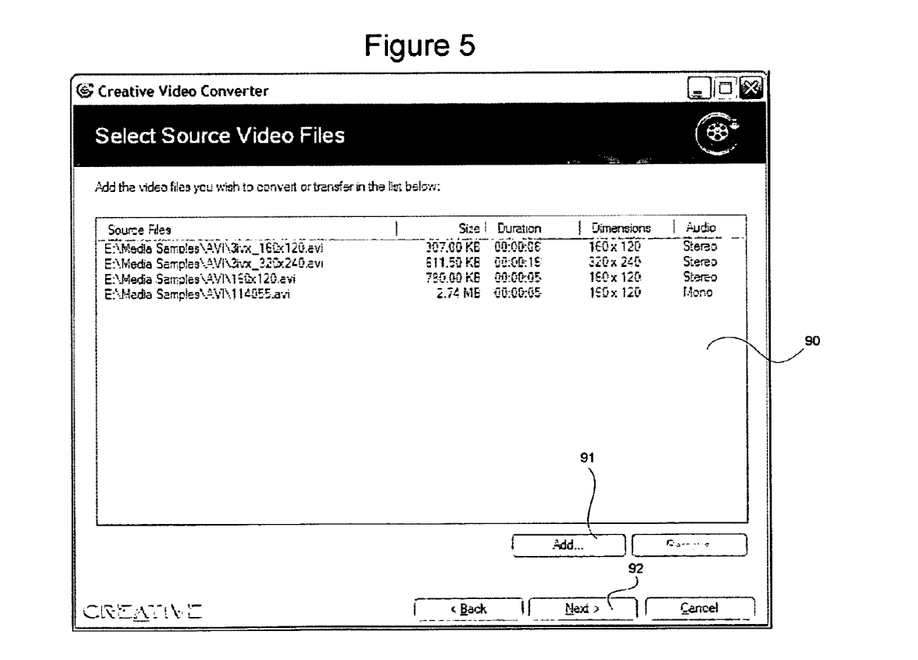
FIG. 5 is a screenshot of a selection page of a client program for file conversion in accordance with a preferred embodiment of the present invention.

The user selects the media files 60 to be transferred to the portable media player 30 from the computer 40. This may be performed by a drag-and-drop action 81 in Windows Explorer 80 (either directly or via a file transfer cum conversion interface) as depicted in FIG. 4, or from a selection screen 90 of the user interface 51 depicted in FIG. 5. In the selection screen 90, the user clicks the "Add" button 91 to add additional media files 60 for conversion and transfer to the portable media player 30. After all media files 60 have been selected, the user clicks the "Next" button 92 to continue to the next screen.

Figure 6:
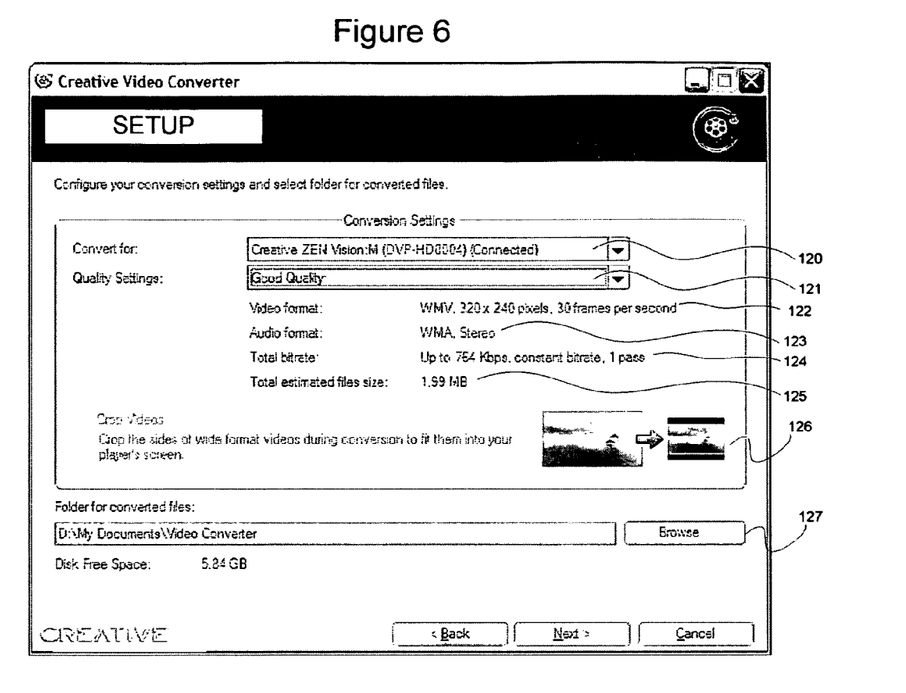
FIG. 6 is a screenshot of a setup interface allowing user selection of output options for the converted file in accordance with a preferred embodiment of the present invention.

Referring to FIG. 6, there is shown a setup screen that enables user selection of output options and settings for the files to be converted and transferred to the portable media player 30. This screen may be optionally accessible by more advanced users who wish to customise the file conversion and transfer process. The detection module 52 detects 5 the type of the portable media player 30. This may be user specified through a drop down box 120 illustrated in FIG. 6, or automatically detected by a computer 40 connected to the portable media player 30. Once the portable media player 30 has been determined, its capabilities and format compatibilities are known to the computer 40. The user may also specify the quality settings from the drop down box 121. Quality settings may, for example include: Excellent Quality, Good Quality or Fair Quality. The specified quality settings may automatically determine the video format 122, audio format 123, bitrate 124 to be used during the conversion process. However, it should be noted that output video and audio formats are original-file dependent. Each media file may be converted differently depending on whether a full conversion, partial conversion or repackage is involved. The customization should be based on playback objectives, such as, for example, optimization for PAL/NTSC TV, optimization for player display resolution, minimization of file size and so forth. Alternatively, the default quality setting may be to maintain the file size of the source media file 60 and maintain the bit rate of the source media file 60. The total estimated file size 125 of the converted file is calculated and displayed to the user. An optional checkbox is provided to the user for indicating whether any cropping of video content is desired. For example, the sides of wide format videos may be cropped to fit for the portable media player's display screen. For the destination of the converted files, the user is able to designate the location by clicking the "Browse" button 127, and choosing an appropriate folder location.

Next, the conversion module 53 performs the conversion of the source media file 60 to a target file for transfer to the portable media player 30. Referring back to FIG. 1, the conversion module 53 determines 6 whether the media file 60 including an audio stream 62, video stream or miscellaneous data 63 (collectively known as media data) is capable of playback on the portable media player 30. The miscellaneous data 63 may be subtitles, script, text and so forth. If it is not, unsupported media data is either discarded 7/not converted or stored in the file container 60. In other words, if the specified portable media player 30 does not have a display screen for video content, it is not capable of playing back the video stream 61. Next, the conversion module 53 determines 10 if the media data is supported by or compatible with the portable media player 30.

If the media data is not supported by or incompatible with the portable media player 30, codecs 55 are filtered 11 to those that are supported by the portable media player 30. A lookup table may be used to filter codecs 55 efficiently, and to prioritise codecs based on conversion speed. From the filtered codecs 55, a codec is selected 12 based on an assessment of playback quality, output file size and file conversion time. The codec is selected on a basis where an algorithm in a client 50 assesses playback quality, output file size and file conversion time to enable a user to both enjoy ease of use with regard to a file transfer/transcoding experience, and a satisfactory media playback experience. The selection of the codec may also consider the quality setting specified by the user. Using the selected codec, the unsupported media data is converted 13 into a target format supported by the portable media player 30. However, if the media data is supported by the portable media player 30, no conversion is performed. The media data is subsequently copied 14 to a file container supported by the portable media player 30. The file container 60 may be the original container or a new container, as long as the container can both support the media data and is supported by the portable media player 30.

If the media data is supported by or is compatible with the portable media player 30, the conversion module 53 determines whether the file container 60 is supported by or compatible with the portable media player 30. If the file container 60 is not supported by or incompatible with the portable media player 30, the media data is subsequently copied 16 to a new file container supported by the portable media player 30.

After conversion to the media file to a format supported by or compatible with the portable media player 30, the converted media file is then transferred from the computer 40 to the portable media player 30. The transfer may be automatic after conversion is completed or delayed according to a time schedule.

Figure 7:
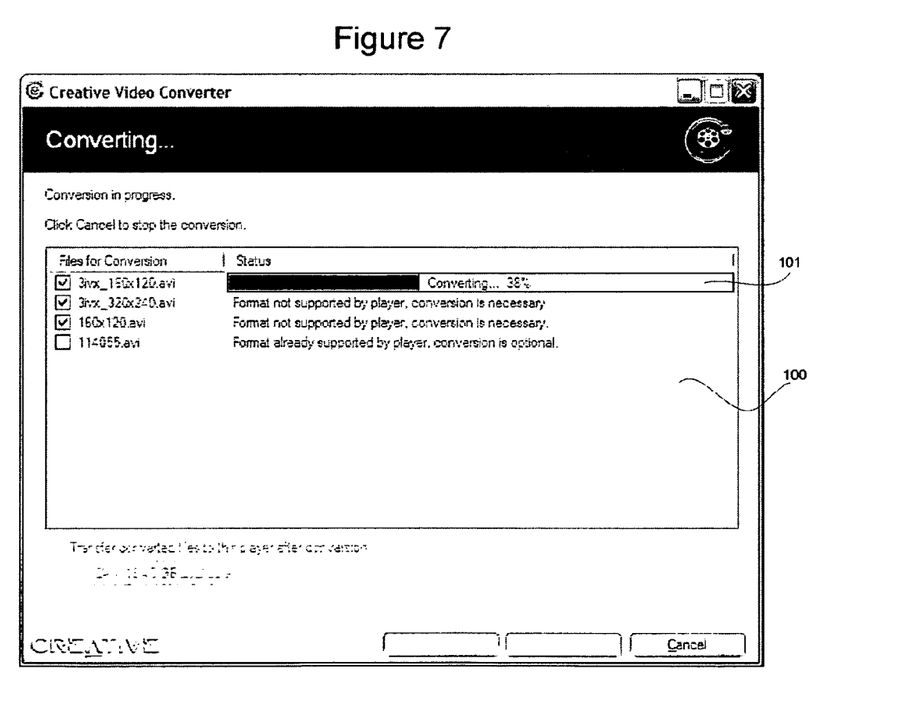
FIG. 7 is a screenshot of the progress of conversion in accordance with a preferred embodiment of the present invention.
Figure 8:
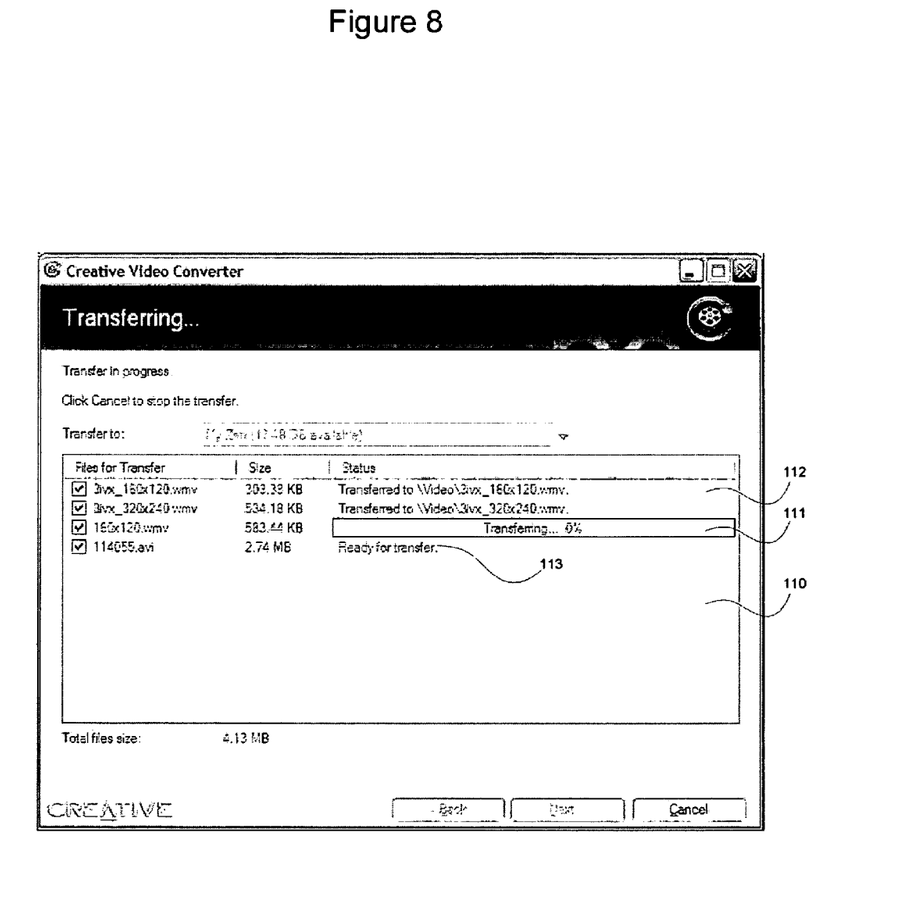
FIG. 8 is a screenshot of the progress of transferring converted filed to a portable media player in accordance with a preferred embodiment of the present invention.

Referring to FIG. 7, a status screen 100 is displayed to visually indicate the user the progress of the conversion process. For each file 60, a status bar 101 is displayed to show the progress of conversion in terms of percentage. Comments are also displayed beside each file 60 to inform the user of the type of conversion necessary. The user is also able to deselect files 60 they do not wish to be converted on the status screen 100 by unchecking a checkbox next to each filename.

Turning back to FIG. 3, each conversion scenario for various media files 60 is described in greater detail. Briefly, when the source video format (the container 60, the audio stream 62, the video stream 61 and miscellaneous data) is supported by the portable media player 30, the source video stream 61 is directly copied to the portable media player 30 without any conversion. When the source audio stream (the container 60 and the audio stream 62) is supported by the portable media player 30, the source audio stream 62 is directly copied to the portable media player 30 without any conversion. When the source video format (the container 60, the audio stream 62 and the video stream 61) is not supported by the portable media player 30, the source video stream 61 is converted to a format supported by or compatible with the portable media player 30. For example, if the portable player media player 30 supports both WMV (maximum resolution: 320×240) and AVI (maximum MPEG4 video resolution: 640×480) formats, an MOV source video (H.264 video at 640×480) is converted to AVI format to preserve the video resolution. If the portable media player 30 does not support video playback, the audio content of the source video is converted to audio using a suitable audio codec in a new audio container (only if the audio content is not supported by the portable media player 30).

Figure 3:
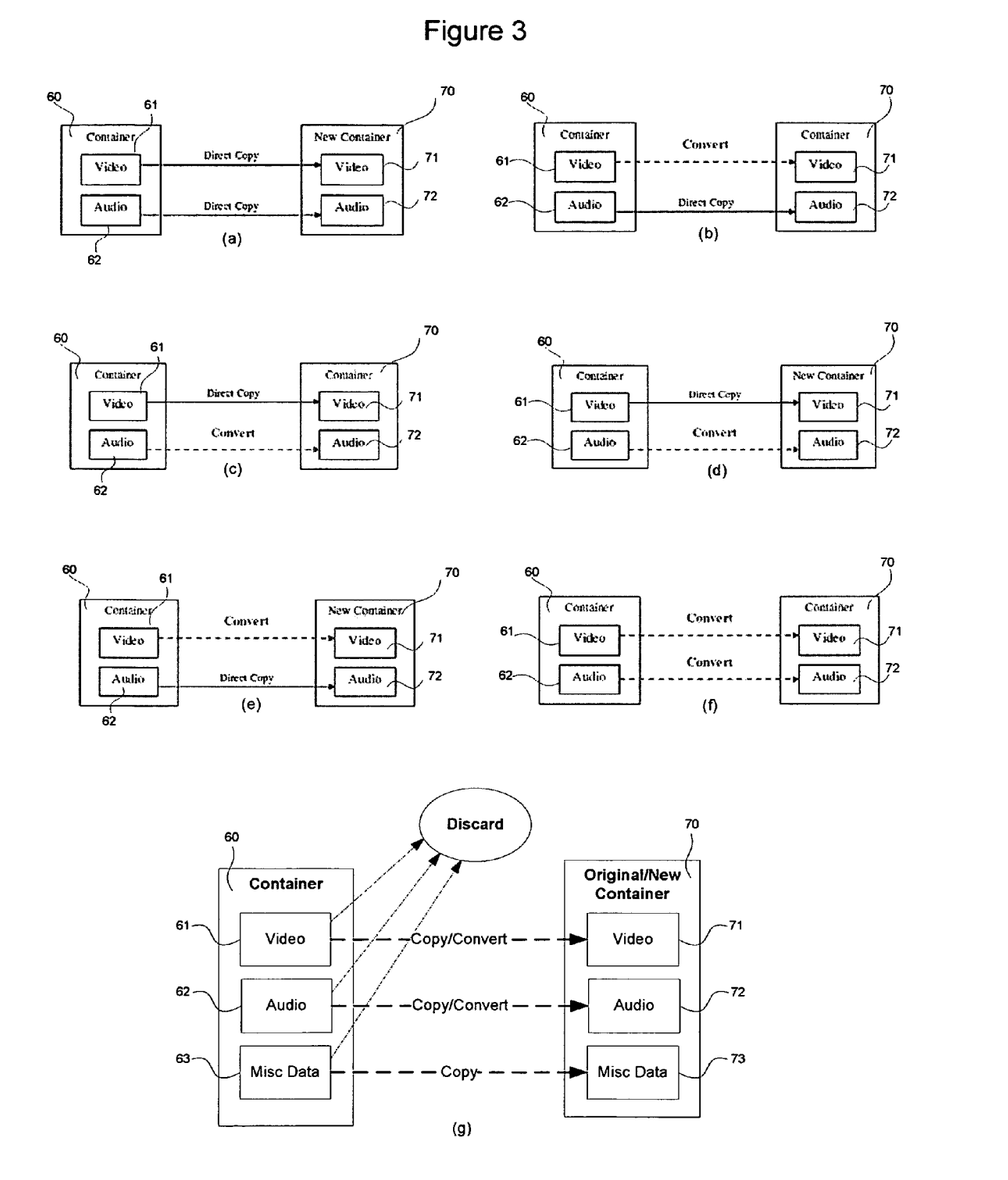
FIG. 3 is an activity diagram of conversion for various digital and audio content in accordance with a preferred embodiment of the present invention.

When the source audio format (the container 60 and the audio stream 62) is not supported by the portable media player 30, the source audio stream 62 is converted to an audio format supported by or compatible with the portable media player 30.

When the source video format is partially supported by or compatible with the portable media player 30, six scenarios may occur:

1. only the file container 60 is not supported by portable media player 30,
2. only the video stream 61 is not supported by the portable media player 30,
3. only the audio stream 62 is not supported by the portable media player 30,
4. both file container 60 and audio stream 62 are not supported by the portable media player 30,
5. both the file container 60 and video stream 62 are not supported by the portable media player 30, or
6. both audio stream 61 and video stream 62 are not supported by the portable media player 30.

In FIG. 3(a), if only file container 60 is not supported by portable media player, both the audio 62 and video 61 streams from the source video are repackaged to a container format 60 supported by the portable media player 30 without any codec conversion.

In FIG. 3(b), if only video stream 61 is not supported by the portable media player 30, the video stream 61 is converted using a video codec 55 that may be specified by the user and which is supported by the portable media player 30 in the same file container format 60. The codec 55 may be selected on a basis where the algorithm in the client 50 assesses playback quality, output file size and file conversion time to enable a user to both enjoy ease of use with regard to a file transfer/transcoding experience, and a satisfactory media playback experience. The audio stream 62 is preserved. If the portable media player 30 does not support video playback, video stream 61 is discarded from the original file container 60 without any conversion.

In FIG. 3(c), if only the audio stream 62 is not supported by the portable media player 30, the audio stream 62 is converted using an audio codec 55 that may be specified by the user and which is supported by the portable media player 30 in the same container format 60. The codec 55 may be selected on a basis where the algorithm in the client 50 assesses playback quality, output file size and file conversion time to enable a user to both enjoy ease of use with regard to a file transfer/transcoding experience, and a satisfactory media playback experience. The video stream 61 is preserved.

In FIG. 3(d), if both the file container 60 and audio stream 62 are not supported by the portable media player 30, the audio stream 62 is converted using an audio codec 55 that may be specified by the user which is supported by the portable media player 30 in the file container format 60 that supports the source video codec. The codec 55 may be selected on a basis where the algorithm in the client 50 assesses playback quality, output file size and file conversion time to enable a user to both enjoy ease of use with regard to a file transfer/transcoding experience, and a satisfactory media playback experience. The video stream 61 is preserved. The converted audio stream 72 and the original video stream 61 is repackaged to the target container format 70.

In FIG. 3(e), if both the file container 60 and video stream 61 are not supported by the portable media player 30, the video stream 61 is converted using a video codec 55 that may be specified by the user and which is supported by the portable media player 30 in the container format 60 that supports the source audio codec. The codec 55 may be selected on a basis where the algorithm in the client 50 assesses playback quality, output file size and file conversion time to enable a user to both enjoy ease of use with regard to a file transfer/transcoding experience, and a satisfactory media playback experience. The audio stream 61 is preserved. The converted video stream 71 and the original audio stream 61 are repackaged into the target container format 70. If the portable media player 30 does not support video playback, the video stream 61 is discarded without any conversion. The audio stream 61 is packaged in a new audio container without conversion.

In FIG. 3(f), if both the audio stream 62 and video stream 61 are not supported by the portable media player 30, both audio and video streams 61, 62 are converted using the codecs that may be specified by the user and which is supported by the portable media player 30. The converted streams 71, 72 are repackaged to the file container format 70 that can store these two streams 71, 72. The codecs may be selected on a basis where the algorithm in the client 50 assesses playback quality, output file size and file conversion time to enable a user to both enjoy ease of use with regard to a file transfer/transcoding experience, and a satisfactory media playback experience. If the portable media player 30 does not support video playback, video stream 61 is discarded without any conversion. The audio stream 62 is converted using the most suitable audio codec in a new audio container.

In FIG. 3(g), a general situation is shown, including where the miscellaneous data 63 may be directly copied or discarded, depending on whether the portable media player 30 is able to support the miscellaneous data 63.

When the source audio format is partially supported by or compatible with the portable media player 30, two scenarios may occur:
1. only the file container 60 is not supported by the portable media player 30, or
2. only the audio stream 62 is not supported by the portable media player 30.

If only the file container 60 is not supported by the portable media player 30, the original audio stream 61 is repackaged into a new audio container supported by the portable media player 30 without conversion.

If only the audio stream 61 is not supported by the portable media player 30, the audio stream 61 is converted using the most suitable audio codec in a new or existing audio container.

The described conversion process may be fully automated without any user intervention. The user may only need to specify the source audio or video files to be transferred and specify the target portable media player 30 for the transfer. The client 50 determines for the file container 60, each stream 61, 62, and miscellaneous data 63 whether to repackage (for a file container) or directly copy (for streams/data), discard (for streams/data), transcode (for streams). The algorithm in the client 50 therefore provides intelligent conversion to enable a user to both enjoy ease of use with regard to a file transfer/transcoding experience, and a satisfactory media playback experience.

The table below illustrates the behaviors of the conversion method for various scenarios.

| Digital Content | | | Portable Media Player (Support Video Playback) |
|---|---|---|---|
| Container | Audio | Video | |
| Video Content | | | |
| + | + | + | Direct copy to player without conversion. |
| + | + | x | Convert video, preserve audio and container. |
| + | x | + | Convert audio, preserve video and container. |
| x | + | + | Repackage audio and video into most suitable video container. |
| + | x | x | Convert audio and video. Package into most suitable video container. |
| x | + | x | Convert video, preserve audio. Package into most suitable video container. |
| x | x | + | Convert audio, preserve video. Package into most suitable video container. |
| x | x | x | Convert audio and video. Package into most suitable video container. |
| Audio Content | | | |
| + | + | — | Direct copy to player without conversion. |
| + | x | — | Convert audio. Package into most suitable audio container. |
| x | + | — | Repackage audio into most suitable audio container. |
| x | x | — | Convert audio. Package into most suitable audio container. |

| Digital Content | | | Portable Audio Player |
|---|---|---|---|
| Container | Audio | Video | |
| Video Content | | | |
| + | + | x | Discard video, preserve audio and container. |
| + | x | x | Discard video, convert audio. Package into most suitable audio container. |
| x | + | x | Discard video, repackage audio into most suitable audio container. |
| x | x | x | Discard video, convert audio. Package into most suitable audio container. |
| Audio Content | | | |
| + | + | — | Direct copy to player without conversion. |
| + | x | — | Convert audio. Package into most suitable audio container. |
| x | + | — | Repackage audio into most suitable audio container. |
| x | x | — | Convert audio. Package into most suitable audio container. |

Key
+ = Supported by player
x = Not supported by player
— = Not applicable

Although only a single video stream and a single audio stream have been described as being stored in the file container, there may be a plurality of video streams and audio streams stored. Other streams are possible such as subtitle streams.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

We claim:
1. A method for automatically converting a media file for playback on a portable media player, the method comprising:
specifying the type of the portable media player;
where a stream of the media file is not capable of being played back by the portable media player, discarding the stream;
where a stream of the media file is capable of being played back and is supported by the portable media player, directly copying the stream to at least one of a file container supportable by the portable media player and the portable media player; and
where a stream of the media file is capable of being played back and is not supported by the portable media player, converting the stream using a predetermined codec that is supported by the portable media player, the predetermined codec selected on a basis of playback quality, output file size and file conversion time.

2. The method according to claim 1, further comprising where a file container of the media file is not supported by the portable media player, repackaging the streams of the media file to a supported file container of the portable media player.

3. The method according to claim 1, wherein the media file comprises at least one item selected from the group consisting of: a video stream, an audio stream and miscellaneous data.

4. The method according to claim 1, further comprising the step of copying the converted media file to the portable media player.

5. The method according to claim 1, wherein the step of specifying the type of the portable media player is selected by the user, or detected automatically if the portable media player is connected to a computer performing the conversion.

6. A system for automatically converting a media file for playback on a portable media player, the system comprising:
   a detection module to determine the type of the portable media player; and
   a conversion module to determine whether a stream of the media file requires transcoding, the conversion module configured for:
   discarding a stream where the stream of the media file is not capable of being played back by the portable media player;
   directly copying a stream to at least one of a file container supportable by the portable media player and the portable media player, where the stream of the media file is capable of being played back and is supported by the portable media player; and
   converting a stream using a predetermined codec that is supported by the portable media player, the predetermined codec selected on a basis of playback quality, output file size and file conversion time.

7. The system according to claim 6, further comprising a file transfer module to transfer the converted media file to the portable media player either automatically or on a delayed time basis according to a predetermined time schedule.

8. The system according to claim 6, further comprising a codec library to store a plurality of codecs, each codec being assigned a priority level on a basis of playback quality, output file size and file conversion time, and associated with a list of supported portable media players.

9. A software program for automatically converting a media file for playback on a portable media player, the software program being embodied in a non-transitory computer readable medium and comprising instructions capable of being executed by a computer for:
   determining the type of the portable media player;
   discarding a stream where the stream of the media file is not capable of being played back by the portable media player;
   directly copying a stream to at least one of a file container supportable by the portable media player and the portable media player, where the stream of the media file is capable of being played back and is supported by the portable media player; and
   converting a stream using a predetermined codec that is supported by the portable media player, the predetermined codec selected on a basis of playback quality, output file size and file conversion time.

* * * * *